United States Patent [19]
Odelid

[11] Patent Number: 5,493,542
[45] Date of Patent: Feb. 20, 1996

[54] ARRANGEMENT FOR PORTABLE COMPUTERS

[75] Inventor: Tomas Odelid, Helsingborg, Sweden

[73] Assignee: LogIn Europe AB, Helsingborg, Sweden

[21] Appl. No.: 170,228

[22] PCT Filed: Jun. 23, 1992

[86] PCT No.: PCT/SE92/00454

§ 371 Date: Jan. 20, 1994

§ 102(e) Date: Jan. 20, 1994

[87] PCT Pub. No.: WO93/00627

PCT Pub. Date: Jan. 23, 1993

[30]     Foreign Application Priority Data

Jun. 28, 1991 [SE] Sweden ................................ 9102044

[51] Int. Cl.⁶ ............................. G04B 47/00; G06F 1/00
[52] U.S. Cl. .................... 368/10; 364/708.1; 364/709.01
[58] Field of Search ...................... 368/10, 88; 361/390, 361/391, 413; 364/708, 705, 709.1

[56]             References Cited

U.S. PATENT DOCUMENTS 4,769,764  9/1988  Levanon .
4,903,222  2/1990  Carter .

FOREIGN PATENT DOCUMENTS 0351315  2/1990  European Pat. Off. .
0429780  6/1991  European Pat. Off. .
9011628  10/1990  WIPO .

*Primary Examiner*—Vit W. Miska
*Attorney, Agent, or Firm*—Kane, Dalsimer, Sullivan, Kurucz, Levy, Eisele and Richard

[57]              ABSTRACT

The invention generally relates to an arrangement for docking a portable computer (100) against a number of peripheral units. Provision is made, e.g. at the rear side of the computer, of a multi-pole docking connector (19) whose poles correspond signalwise to the poles of conventional peripheral connectors (118a–f) of the computer (100). At the same time, access to the peripheral connectors (118a–f) is maintained, optionally in the form of copies (18a–f), signalwise and with respect to type, so that peripheral units can be connected to the computer (100), either in a docking station via the docking connector (19), e.g. in stationary use of the computer (100), or in conventional manner directly via the peripheral connectors (118a–f) or via the above copies (18a–f) thereof, e.g. when the computer (100) is used in the field.

13 Claims, 5 Drawing Sheets

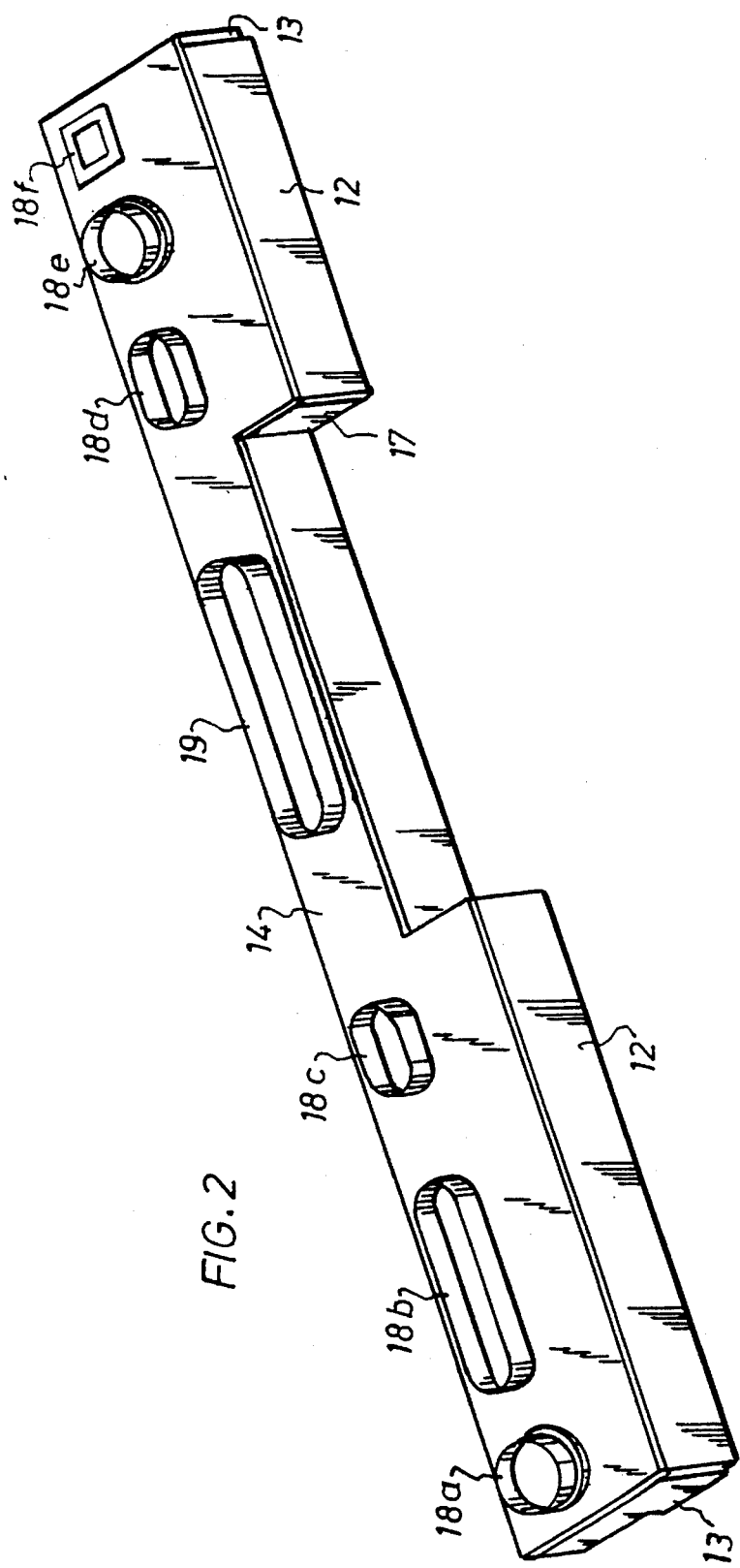
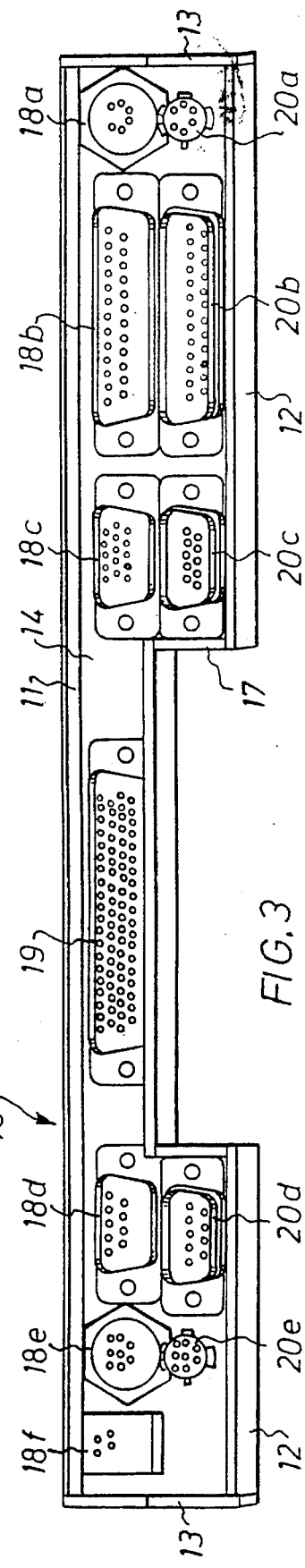
FIG.2
FIG.3

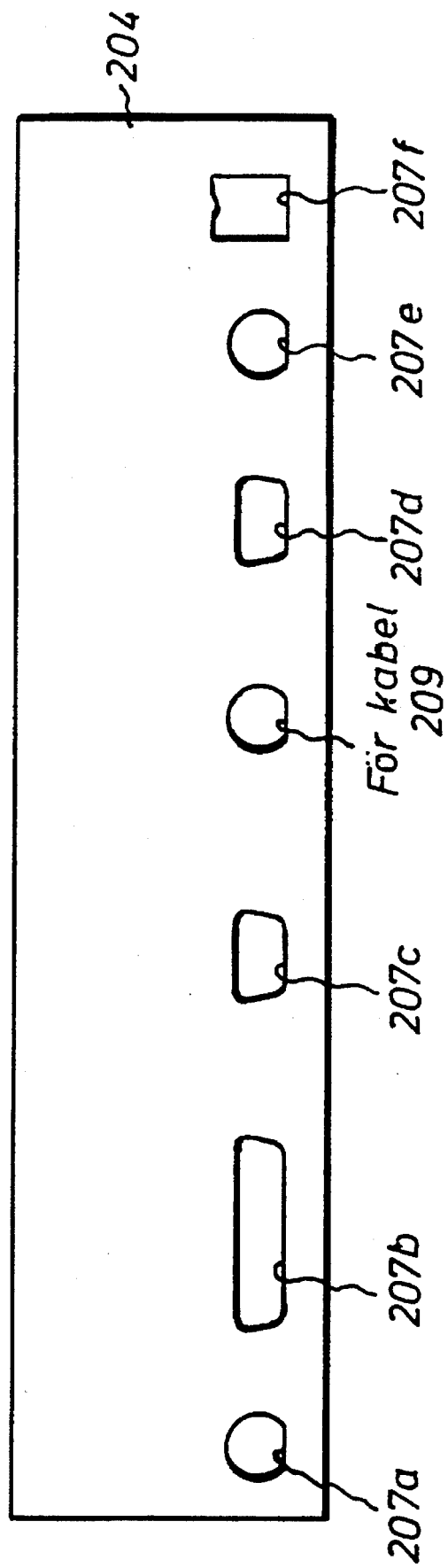

ARRANGEMENT FOR PORTABLE COMPUTERS

The present invention generally relates to the docking of portable computers. More specifically, the invention concerns, according to a first aspect, an ancillary device for a portable computer; according to a second aspect, a portable computer; and according to a third aspect, a docking station.

Normally, a portable computer contains a number of components, such as a processor, a fold-up LCD display screen, an optionally detachable keyboard, a main storage, one or more hard disc units, and a battery.

Conventionally, a portable computer of this type has, normally provided at the back, but sometimes also at the side, a plurality of separate peripheral connectors, usually being of different types and having different numbers of poles (i.e. number of contact sleeves or contact pins), for connecting peripheral units to the portable computer. Typically, such peripheral connectors comprise: a 'modular socket' for telephone or facsimile transmission; a scanner interface; a serial RS-232 interface for connecting a mouse, a plotter, a printer, a modem, a digitalising table, and so forth; a connector for connection to an external display device (VGA); a parallel Centronics interface for the connection of a printer, a floppy-disc station, and so forth; and a connector for the connection of an outer, numerical or alphanumerical keyboard, and so forth.

Apart from such peripheral connectors, a portable computer of this type is conventionally equipped with a multipole bus connector arranged on the rear side of the chassis and adapted to connect an outer expansion unit with a view to achieving a more powerful computer system, as compared with the portable computer. Such an expansion unit may include e.g. a network card for connection to a computer network, an emulating card, a graphic card, and so forth.

Usually, a portable computer of this type also has a socket at the rear or at the side of the chassis, for the connection of an external power supply, e.g. via the network adapter.

Today's portable computers are so powerful that they are advantageously used not only 'in the field', but also 'stationarily' in an office or the like. In stationary use, it is often desirable to expand the portable computer, which is done by connecting the bus connector of the computer to a matching bus connector of a cable from an expansion unit, and to connect one or more peripheral units of the above type to the portable computer, which is done by connecting separate cables to the peripheral connectors of the portable computer.

For the user, it is inconvenient to have to manually connect and disconnect a large number of separate cables every time the portable computer is to be moved to or taken from the 'stationary' environment.

U.S. Pat. No. 4,769,764, for instance, discloses the use of a base or docking station when a portable computer is to be employed 'stationary' for some time. The base or docking station which in a rear receiving space has a bus connector matching the bus connector of the portable computer, such that the computer bus is automatically connected to the expansion unit when the portable computer is placed in the receiving space of the docking station. The US specification does not, however, disclose the docking of a peripheral connector of the computer.

The present invention has been developed with a view to obviating the above inconveniences of the prior art. The general object of the invention is to enable simple and safe docking of a portable computer against peripheral units without the need of manual connection and disconnection of a large number of cables and connectors.

According to a first aspect of the invention, this object is achieved by the provision of an ancillary device for a portable computer of the above type, which is characterised by

- a frame having a mounting side and a docking side and being designed to be attached on the outside of the computer for mounting the ancillary device,
- a second plurality of peripheral connectors supported by said frame,
- at least one docking connector supported by said frame and designed to be connected, by the docking of the computer in an associated docking station, to a matching connector of the docking station for connection of peripheral units to the computer via the docking station, and
- a circuit means for establishing an electric connection between the peripheral connectors of the computer and the peripheral connectors as well as the docking connector of the ancillary device,
- whereby the peripheral connectors of the ancillary device enable conventional connection of peripheral units to the computer also when the latter is not docked in the docking station.

The inventive idea can also be implemented internally in a portable computer. A second aspect of the invention therefore concerns a portable computer of the above type, which is characterised in that the computer further supports at least one outer docking connector which has a number of poles at least equal to the total number of signal-carrying poles of the peripheral connectors of the computer, and that at least the main part of the signal-carrying poles of the peripheral connectors of the computer are electrically connected to a pole of their own amongst the poles of the docking connector, the docking connector being adapted to be connected, by the docking of the computer in an associated docking station, to a matching connector of the docking station for connection of peripheral units to the computer via the docking station, the peripheral connectors being intended not to be used when the computer is docked in the docking station.

Whether the invention is implemented as an ancillary device to be mounted as a separate unit on the computer, or implemented internally in the computer, the invention is distinguished by (1) the provision of a 'common connector' for docking purposes in stationary use, providing safe and simple docking against peripheral units, and (2) access also to the peripheral connectors of the computer, or to 'copies' thereof for the connection of peripheral units to the portable computer, e.g. in field use, when the user has no access to a docking station or does not wish to use one.

When the invention is implemented as a separate ancillary device, the circuit means may comprise a plurality of mounting connectors which are accessible from the mounting side of the frame and match the peripheral connectors of the computer so as to be connected thereto when the ancillary device is mounted on the computer, as well as wire means or the like for establishing an electric connection between the mounting connectors and the peripheral connectors as well as the docking connector of the ancillary device.

Preferably, at least the main part of the peripheral connectors of the ancillary device are, both with respect to type and signalwise, essentially copies of the respective peripheral connectors of the computer, such that the original connecting performance of the portable computer with respect to peripheral units via separate cables remains the same, despite the mounting of the ancillary device on the computer.

Other preferred embodiments of the ancillary device and the portable computer according to the invention appear from the appended subclaims.

The invention also concerns a docking station for accommodating either (i) a portable computer provided with an ancillary device according to the invention, or (ii) a portable computer according to the invention. The docking station according to the invention has a receiving space in which the computer is to be introduced with a view to interconnecting the docking connector of the ancillary device/the computer and a matching connector, thereby automatically connecting peripheral units to the computer when this is placed in the docking station. When the computer is docked, all or at least the main part of the peripheral connectors of the ancillary device/the computer are not used and situated substantially inaccessible in the receiving space of the docking station.

The use of such a docking station has, inter alia, the advantage of eliminating the risk of different peripheral units being simultaneously connected both to the docking connector and directly to the peripheral connectors.

The invention will be described in more detail below with the aid of a non-restricting embodiment and with reference to the accompanying drawings, in which FIG. 1 is a schematic perspective view of a frame of an ancillary device according to an embodiment of the invention, as seen from a docking side of the ancillary device;

FIG. 2 shows the frame of FIG. 1 supplemented with schematically illustrated connectors;

FIG. 3 shows the ancillary device of FIG. 2 as seen from its opposite side (mounting side);

FIG. 7 shows a rear wall of the docking station of FIG. 6; and

Figure 1:
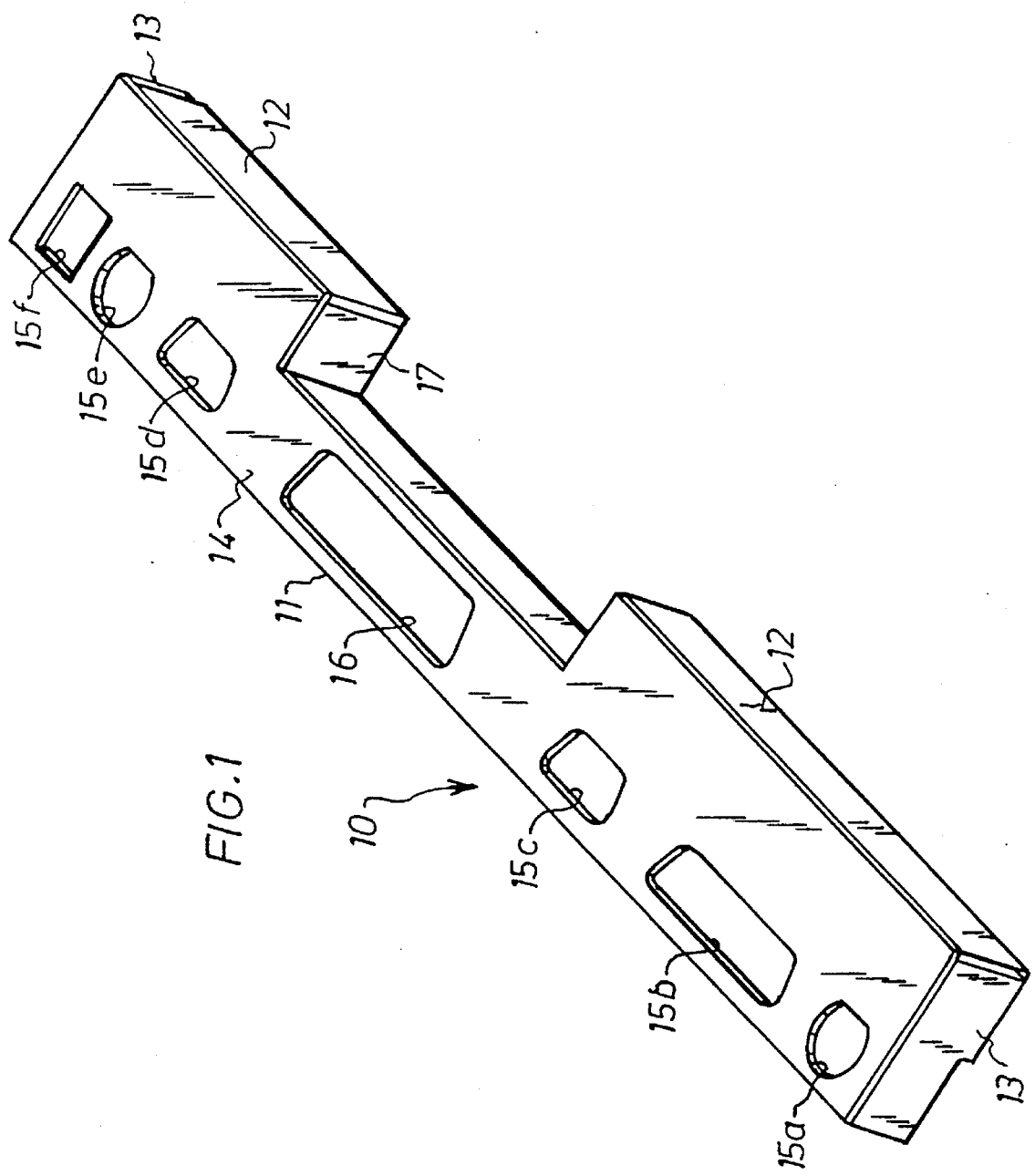

FIG. 1 illustrates a frame, generally designated 10, which forms part of an ancillary device according to the invention for a portable computer. The frame 10 essentially has the shape of an elongate hood having a top wall 11, a bottom wall 12, two opposing end walls 13, a rear wall 14 constituting a docking side of the ancillary device and being formed with non-uniform recesses 15a–f, 16 for the mounting of connectors, and an open front constituting a mounting side of the ancillary device. Approximately at the centre of the ancillary device, the bottom wall 12 of the frame 10 has an elongate recess 17, whose function will be described below.

Figure 5:
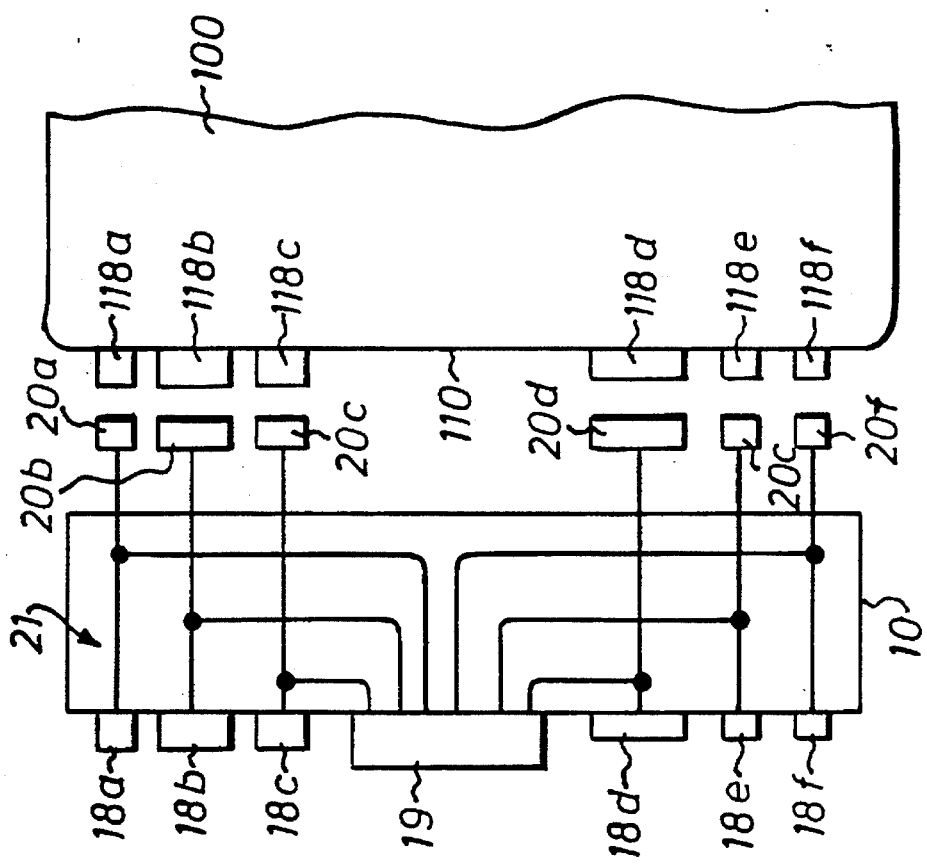
FIG. 5 is a highly simplified view of the printed circuit board of FIG. 4 and basically illustrates how the ancillary device is electrically connected to a portable computer.
Figure 6:
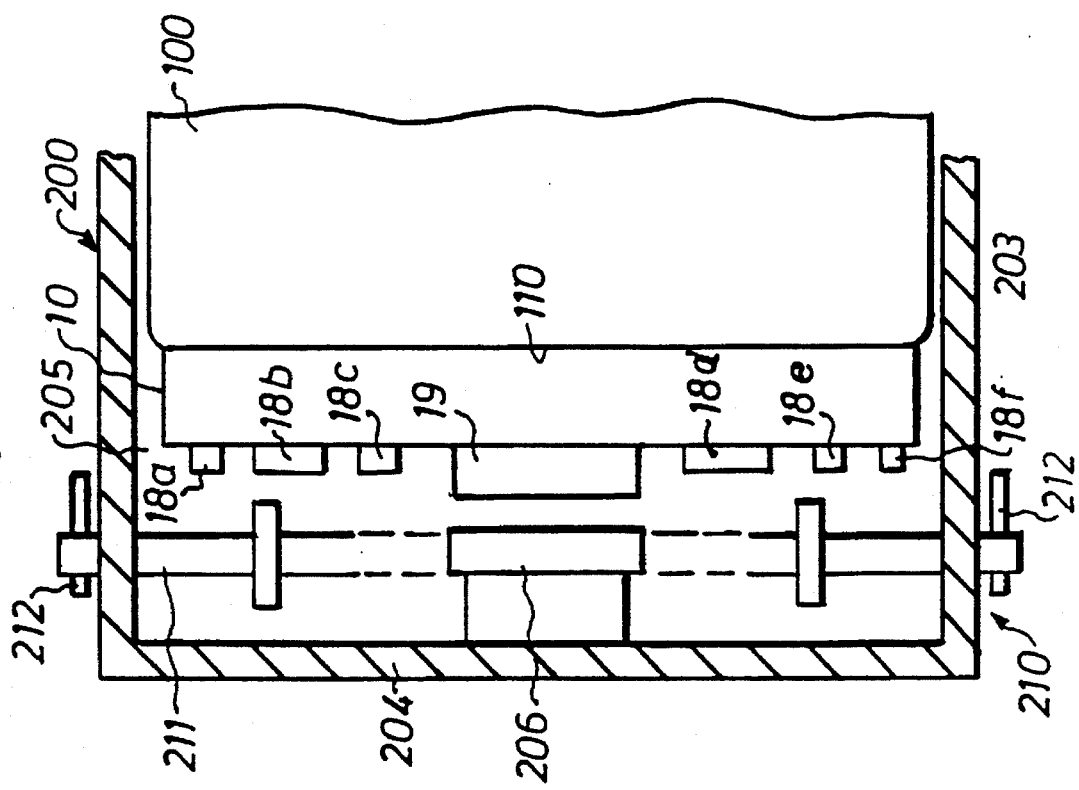
FIG. 6 is a schematic plan view of an almost completely docked, portable computer equipped with the ancillary device of FIGS. 1–5.

The frame 10 is adapted to be fixed, e.g. by means of a screw joint, on the outside of a rear side 110 of the chassis of a portable computer 100, as illustrated schematically in FIGS. 5 and 6. Thus, the frame 10 has a length and a height substantially corresponding to the width and the height, respectively, of the rear side 110 of the computer chassis.

In the recesses 15a–f of the frame 10 are mounted a plurality of connectors 18a–f, which in the following are referred to as the peripheral connectors of the ancillary device and which, in the illustrated embodiment, are essentially identical with a corresponding number of outer, conventional connectors 118a–f mounted on the rear side 110 of the portable computer 100 (see FIG. 5) and adapted to be connected to peripheral units (not shown).

In this context, the peripheral connectors 118a–f of the portable computer are assumed to comprise:

18a: A 6-pole connector of 'mini-DIN' type for connection to an external, numerical or alpha numerical keyboard;

118b: A 25-pole, 2-row parallel Centronics interface for the connection of a printer, a floppy-disc station, and so forth;

118c: A 15-pole, 3-row connector for connection to e.g. an external display device (VGA);

118d: A 9-pole, 2-row serial RS-232 interface for the connection of a mouse, a plotter, a printer, a modem, a digitalising table, and so forth;

118e: An 8-pole scanner interface of 'mini-DIN' type; and

118f: A 4-pole 'modular socket' for telephone or facsimile transmission.

In the illustrated embodiment, the peripheral connectors 18a–f of the ancillary device are, in respect of type, copies of the corresponding peripheral connectors 118a–f of the computer, but may also be of another type.

The ancillary device further comprises circuit means 20a–f and 21 for establishing an electric connection between the peripheral connectors 118a–f of the computer 100 and the peripheral connectors 18a–f of the ancillary device 10. The circuit means include a number of mounting connectors 20a–f (20f not shown in FIG. 3) which, as shown in FIG. 3, are accessible from the open mounting side of the frame 10 and which match the peripheral connectors 118a–f of the portable computer 100 so as to be connected thereto when the ancillary device is mounted. Further, the circuit means comprise a printed circuit board 21 or the like (not shown in FIG. 3), which is arranged in the frame 10 and, as shown in FIG. 5, establishes a permanent direct electric connection between each peripheral connector 18a–f and the corresponding mounting connector 20a–f.

In the recess 17 of the frame 10 is mounted a 78-pole, 4-row connector 19, in the following referred to as the docking connector of the ancillary device. As illustrated in FIG. 5, the printed circuit board 21 also establishes a permanent direct electric connection to the docking connector 19 of the ancillary device and each of its mounting connectors 20a–f.

When the ancillary device is to be mounted on the portable computer 100, each mounting connector 20a–f of the ancillary device is first connected to the peripheral connectors 118a–f of the computer 100, and the frame 10 is then screwed onto the rear side 110 of the chassis of the computer 100. Thus, the peripheral connectors 118a–f of the computer 100 are concealed within the frame 10 of the ancillary device, but are accessible on the ancillary device, both in the form of copies, with respect to type and signalwise, namely the peripheral connectors 118a–f, and in the form of a single common connector, namely the docking connector 19, of which each pole is connected, via the printed circuit board 21, directly to a corresponding pole of one of the peripheral connectors 118a–f of the computer 100.

Figure 4:
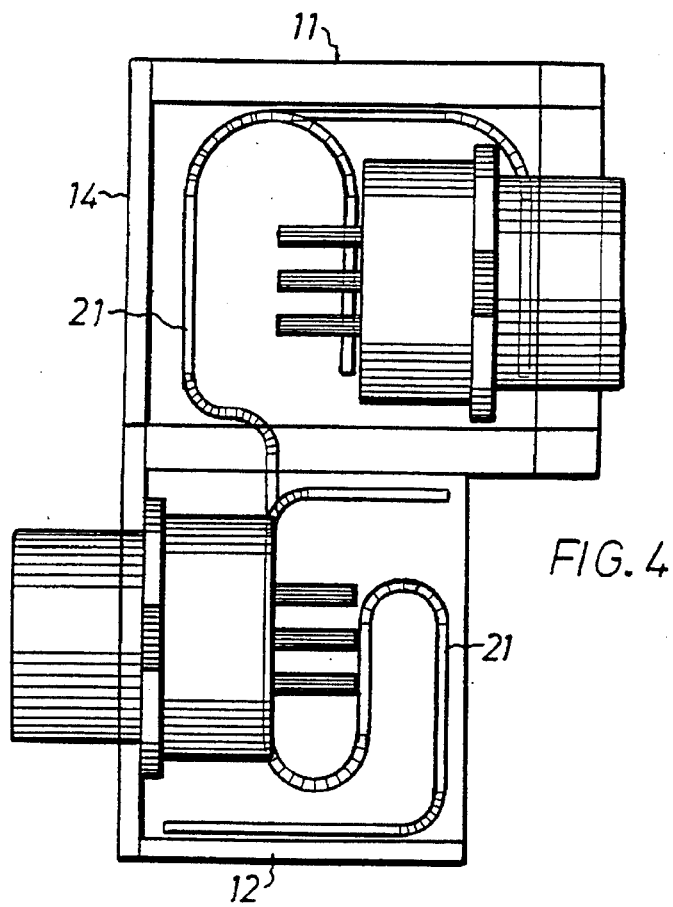
FIG. 4 is a cross-section of the ancillary device of FIGS. 2 and 3 and schematically illustrates an internal printed circuit board.

The printed circuit board 21 may be of any optional type and comprise separate wirings or, as is preferred, a so-called flexible printed circuit board formed in one piece (see FIG. 4) and having flaps for connection to the peripheral connectors 18a–f, the docking connector 19 and the mounting connectors 20a–f of the ancillary device. The mounting connectors may be 'loosely hanging' in the printed circuit board 21 at the open mounting side of the ancillary device.

Figure 8:
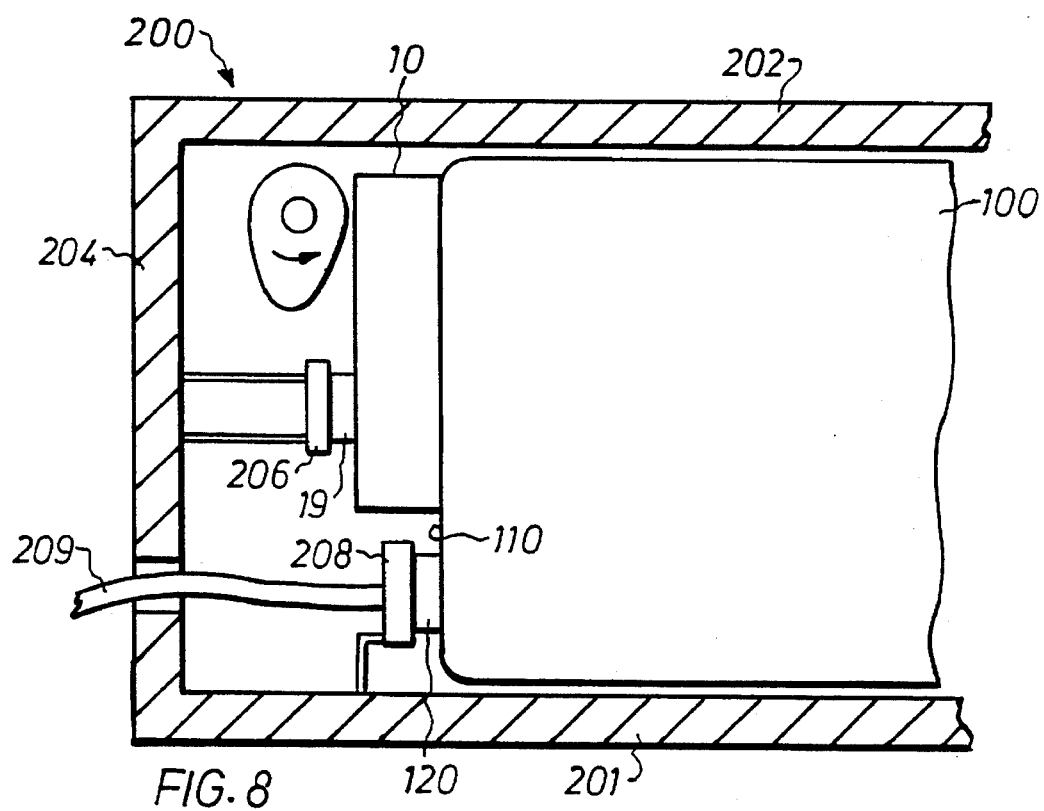
FIG. 8 is a cross-section illustrating the arrangement of FIG. 6 from the side, the computer being completely docked.

FIGS. 6–8 schematically illustrate parts of a docking station 200 for receiving a portable computer 100 equipped with an ancillary device of the above type. The docking station 200 has a bottom wall 201, a top wall 202, opposing side walls 203 and a rear wall 204. The walls 201–204 together define an open-front receiving space 205 in which the computer 100 and the ancillary device mounted thereon are to be introduced.

A 78-pole docking connector 206 is rigidly mounted at a distance in front of the rear wall 204 of the docking station 200. The docking connector 206 matches the docking connector 19 of the ancillary device so as to be connected thereto by the introduction of the computer 100 into the receiving space 205.

When the computer 100 is thus docked in the receiving space 205, the peripheral connectors 18*a–f* of the ancillary device are electrically unconnected in the receiving space and are essentially inaccessible therein.

As illustrated with regard to the ancillary device in FIG. 5, the docking connector 206 of the docking station 200 is electrically connected to a number of peripheral connectors (not shown) mounted in recesses 207*a–f* (FIG. 7) in the rear wall 204 of the docking station 200. These peripheral connectors are adapted to be connected by cables to one or more peripheral units of the above type. Also, they may be internally connected in the docking station itself, in which case some of the peripheral connectors of the docking station can be dispensed with.

In addition to the peripheral connectors 118*a–f*, the portable computer 100 has, in known manner, a multi-pole bus connector 120 (schematically illustrated in FIG. 8, but not shown in FIG. 7) arranged on the rear side 110 of the chassis for the connection of a 16-bit computer bus of the portable computer 100 to an external expansion unit (not shown). For instance a network card for communication between the portable computer 100 and an external computer network, a graphic card, and so forth, may be inlcuded in such an expansion unit.

The recess 17 in the bottom wall 12 of the frame 10 of the ancillary device is adapted to unchassis the bus connector 120 when the ancillary device is mounted. As shown in FIG. 8, the bus connector 120 of the computer 100 can thus be connected to a matching multi-pole connector 208 in the receiving space 205 of the docking station 200, at the same time as the docking connectors 19 and 206 are interconnected by the introduction of the computer 100 into the receiving space 205, the further connection to an expansion unit via a cable 209 being performed in conventional manner.

Also, provision can be made of a docking connector 19 having a sufficient number of poles to be connected also to the bus connector 120 of the computer 100.

Moreover, it is conceivable to arrange more than one docking connector of the above type for docking, each against a matching connector of the docking station.

Further, the docking station 200 shown in FIGS. 6 and 8 is provided with an ejector 210 in order to facilitate the removal of the portable computer 100 from the receiving space 205. The ejector 210 comprises a horizontal, rotatably mounted shaft 211 extending over the entire width of the receiving space 205 at a position between the rear wall 204 and the docking side of the ancillary device. The shaft 211 extends through two holes in the side walls 203 and is, on the outside of these walls, rigidly connected to handles 212 for manual rotation of the shaft 211. Inside the receiving space, two cam discs 213 are rigidly mounted on the shaft 211, one on each side of the docking connector 206.

With the ejector 210, the user may easily eject the computer 100 from the docking station 200 by turning the handles 212 in the direction indicated by an arrow in FIG. 8.

It will be appreciated that the embodiment of the ancillary device described above and illustrated in the drawings is by no means restricting, and the invention may be modified in many ways within the scope of the appended claims.

For instance, also a power supply to the portable computer 100 can be connected by means of the docking connector 19. This connector need not necessarily be connected to all the peripheral connectors of the computer. Optionally, some of these peripheral connectors may be accessible and not concealed by the frame 10 of the ancillary device. In addition, all the poles of the peripheral connectors 118*a–f* of the computer 100 need not be connected to the docking connector 19 of the ancillary device.

The inventive idea is described above with reference to an ancillary device or adapter designed to be mounted as a separate unit on the outside of a portable computer. As mentioned above, the inventive idea may, however, be implemented otherwise, namely by supplementing a portable computer with a docking connector corresponding to the docking connector 19 of the ancillary device and by internally establishing in the computer such an electric connection to the peripheral connectors 118*a–f* that the poles thereof are found as 'copies' in the form of poles of the supplementary docking connector of the computer. According to this aspect of the invention, the docking principle is essentially the same as when the invention is implemented as an ancillary device.

I claim:

1. An ancillary device for a portable computer (100) having a first plurality of outer peripheral connectors for connecting peripheral units to the computer (100), the ancillary device including:

a frame (10) having a mounting side and a docking side and being designed to be attached on the outside of the computer (100) for mounting the ancillary device, a second plurality of peripheral connectors (18*a–f*) supported by said frame (10), at least one docking connector (19) supported by said frame (10) and designed to be connected, by the docking of the computer (100) in an associated docking station (200), to a matching connector (206) of the docking station (200) for connection of peripheral units to the computer (100) via the docking station (200), and a circuit means (20*a–f*, 21) for establishing an electrical connection between the peripheral connectors (118*a–f*) of the computer (100) and the peripheral connectors (18*a–f*) of the ancillary device and between the peripheral connectors (118*a–f*) of the computer (100) and the docking connector (19) of the ancillary device, whereby the peripheral connectors (18*a–f*) of the ancillary device enable conventional connection of peripheral units to the computer (100) when the latter is not docked in the docking station (200).

2. An ancillary device as claimed in claim 1, wherein at least the main part of the peripheral connectors (18*a–f*) of the ancillary device are, both with respect to type and signalwise, essentially copies of the respective peripheral connectors (118*a–f*) of the computer (100), when the ancillary device is mounted.

3. An ancillary device as claimed in claim 1 or 2, wherein the circuit means (20*a–f*, 21) comprises a plurality of mounting connectors (20a–f) which are accessible from the mounting side of the frame (10) and match the peripheral connectors (118a–f) of the computer (100) so as to be connected thereto when the ancillary device is mounted on the computer (100), as well as wire means (21) or the like for establishing an electric connection between the mounting connectors (20a–f) and the peripheral connectors (18a–f) as well as the docking connector (19) of the ancillary device.

4. An ancillary device as claimed in claim 1, wherein the docking connector (19) has a number of poles at least equal to the total number of signal-carrying poles of the peripheral connectors (118a–f) of the computer (100), and that at least the main part of the signal-carrying poles of the peripheral connectors (118a–f) of the computer (100) are electrically connected, by the circuit means (20a–f, 21), to a respective pole of the docking connector (19) of the ancillary device.

5. An ancillary device as claimed in claim 1, wherein the frame (10) substantially comprises a hood having a top wall (11), a bottom wall (12), opposing end walls (13), a rear wall (14) which constitutes the docking side of the frame (10) and is formed with recesses (15a–f) for mounting the peripheral connectors (18a–f) and the docking connector (19) of the ancillary device, and an open side opposite to the rear wall (14) and constituting the mounting side of the frame (10).

6. An ancillary device as claimed in claim 1, wherein the circuit means (20a–f, 21) is provided essentially within said frame.

7. An ancillary device as claimed in claim 1, wherein the frame (10) conceals the peripheral connectors (118a–f) of the computer (100) when the ancillary device is mounted.

8. An ancillary device as claimed in claim 1, wherein the frame (10) is adapted to be attached at a rear side (110) of the computer (100) and is an elongate element having a length substantially corresponding to a width of the computer (100) at said rear side.

9. An ancillary device as claimed in claim 1, wherein the portable computer (100) further has at its rear side (110) an outer bus connector (12) for connecting the computer to a matching bus connector (206) in order to achieve an expanded computer system, wherein that the frame (10) does not conceal the bus connector (120) of the computer (100) when the ancillary device is mounted.

10. A portable computer (100) having a plurality of outer peripheral connectors (118a–f) for connecting peripheral units to the computer (100), wherein:
  the computer (100) further supports at least one outer docking connector which has a number of poles at least equal to the total number of signal-carrying poles of the peripheral connectors (118a–f) of the computer, and
  at least the main part of the signal-carrying poles of the peripheral connectors (118a–f) of the computer are electrically connected to a respective pole of the docking connector,
  the docking connector being adapted to be connected, by the docking of the computer (100) in an associated docking station (200), to a matching connector (206) of the docking station for connection of peripheral units to the computer (100) via the docking station, the peripheral connectors (118a–f) being substantially inaccessible when the computer is docked in the docking station (200).

11. A portable computer (100) as claimed in claim 10, the rear side (110) of the chassis further supports an outer bus connector (120) which is separate from the docking connector and is provided for connecting the computer (100) to a matching bus connector (206) in order to achieve an expanded computer system.

12. A combination including:
  a portable computer (100) having a first plurality of outer peripheral connectors for connecting peripheral unit to the computer (100):
  a docking station (200) for receiving the portable computer (100) equipped with an ancillary device;
  said ancillary device including:
  a frame (10) having a mounting side and a docking side and being designed to be attached on the outside of the computer (100) for mounting the ancillary device,
  a second plurality of peripheral connectors (18a–f) supported by said frame (10),
  at least one docking connector (19) supported by said frame (10) and designed to be connected, by the docking of the computer (100) in an associated docking station (200), to a matching connector (206) of the docking station (200) for connection of peripheral units to the computer (100) via the docking station (200), and
  a circuit means (20a–f, 21) for establishing an electrical connection between the peripheral connectors (118a–f) of the computer (100) and the peripheral connectors (18a–f) of the ancillary device and between the peripheral connectors (118a–f) of the computer (100) and the docking connector (19) of the ancillary device,
  whereby the peripheral connectors (18a–f) of the ancillary device enable conventional connection of peripheral units to the computer (100) also when the latter is not docked in the docking station (200)
  wherein the docking station includes a receiving space (205) which is open at the front and into which the computer (100) is insertable to interconnect the docking connector (19) of the ancillary device and a matching connector (206) of the docking station (200) arranged in the receiving space (205) for connecting peripheral units to the computer (100) via the docking station (200), at least a main part of the peripheral connectors (18a–f) of the ancillary device being substantially inaccessible in the receiving space (205) of the docking station (200) when the computer (100) is docked.

13. A combination including:
  a portable computer (100) having a first plurality of outer peripheral connectors for connecting peripheral unit to the computer (100), said computer (100) further supporting at least one outer docking connector which has a number of poles at least equal to the total number of signal-carrying poles of the peripheral connectors (118a–f) of the computer, and
  at least the main part of the signal-carrying poles of the peripheral connectors (118a–f) of the computer are electrically connected to a pole of their own amongst the poles of the docking connector,
  the docking connector being adapted to be connected, by the docking of the computer (100) in an associated docking station (200), to a matching connector (206) of the docking station for connection of peripheral units to the computer (100) via the docking station, the peripheral connectors (118a–f) being intended not to be used when the computer is docked in the docking station (200);
  a docking station (200) for receiving said portable computer (100) the docking station including a receiving space (205) which is open at the front and into which the computer (100) is insertable to interconnect the docking connector of the computer (100) and a matching connector (206) of the docking station (200) arranged in the receiving space (205) for connecting peripheral units to the computer (100) via the docking station (200), all or at least the main part of the peripheral connectors (118a–f) of the computer (100) being substantially inaccessible in the receiving space (205) of the docking station (200) when the computer (100) is docked.

* * * * *